Figure 1:
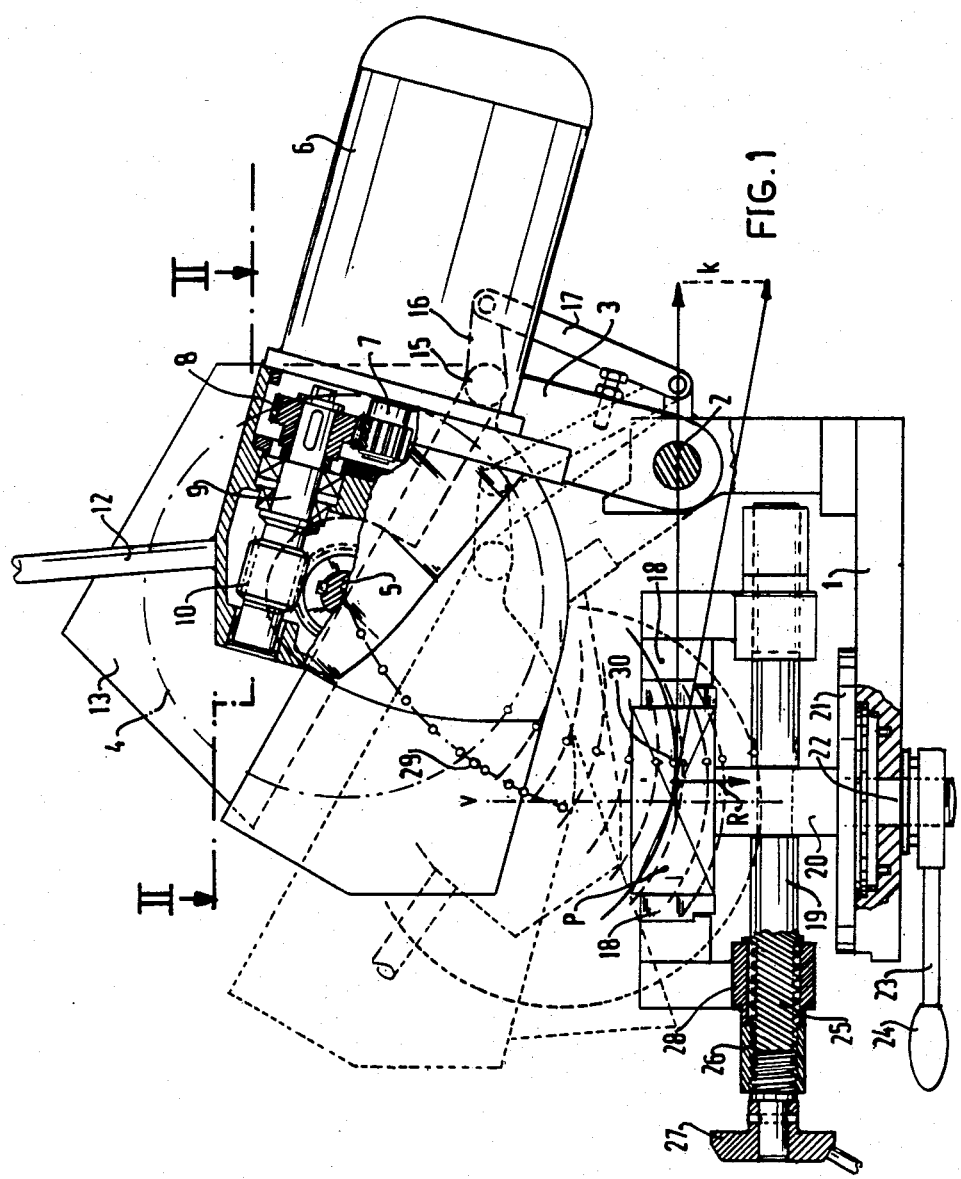

United States Patent [19]

van de Wouw

[11] Patent Number: 4,489,633

[45] Date of Patent: Dec. 25, 1984

[54] SAWING DEVICE AND ASSOCIATED CLAMP AND SAFETY CAP

[75] Inventor: Cornelis A. M. van de Wouw, Berkel-Enschot, Netherlands

[73] Assignee: Machinefabriek Bewo B.V., Tilburg, Netherlands

[21] Appl. No.: 304,654

[22] Filed: Sep. 23, 1981

[30] Foreign Application Priority Data

Nov. 10, 1980 [NL] Netherlands ............... 8006124

[51] Int. Cl.³ .................. B23D 47/04; B23D 47/08
[52] U.S. Cl. .......................... 83/464; 83/478; 83/490; 83/589; 83/453
[58] Field of Search ............... 83/490, 464, 478, 589, 83/453

[56] References Cited

U.S. PATENT DOCUMENTS

| | | | |
|---|---|---|---|
| 1,138,927 | 5/1915 | Berry | 83/453 |
| 1,936,047 | 11/1933 | Chryst | 83/453 |
| 3,626,783 | 12/1971 | Jägers | 83/490 |
| 4,262,564 | 4/1981 | Kaltenbach | 83/490 X |
| 4,343,213 | 8/1982 | Drixler | 83/490 X |

FOREIGN PATENT DOCUMENTS 859992 1/1961 United Kingdom ............... 83/478

Primary Examiner—Donald R. Schran
Attorney, Agent, or Firm—Diller, Ramik & Wight

[57] ABSTRACT

A sawing device comprising a frame 1, a clamp provided with mutually displaceable jaw 18, at least one of which is provided with a screw sleeve 26 co-operating with a screw spindle 19, the length of the screw sleeve together with the thickness of the jaw is equal to or larger than the axial length of the screwthread on the spindle, a holder 3 adapted to pivot about a shaft 2 of the frame 1, a circular saw blade 4 rotatably journalled in said holder, the blade being at right angles to the shaft, and a cap 13 extending around the saw blade 4, said cap comprising a part 13 being stationary relative to the saw blade and at least one part 14 pivoted to the stationary part and connected with the frame by means of a leverage 16, and wherein in all positions of the holder 3 the tangential point 30 formed by an imaginary tangential line going through the shaft at the circumference of the saw blade is located between the medium perpendicular plane V—V of the clamping jaws 18 and the shaft.

7 Claims, 5 Drawing Figures

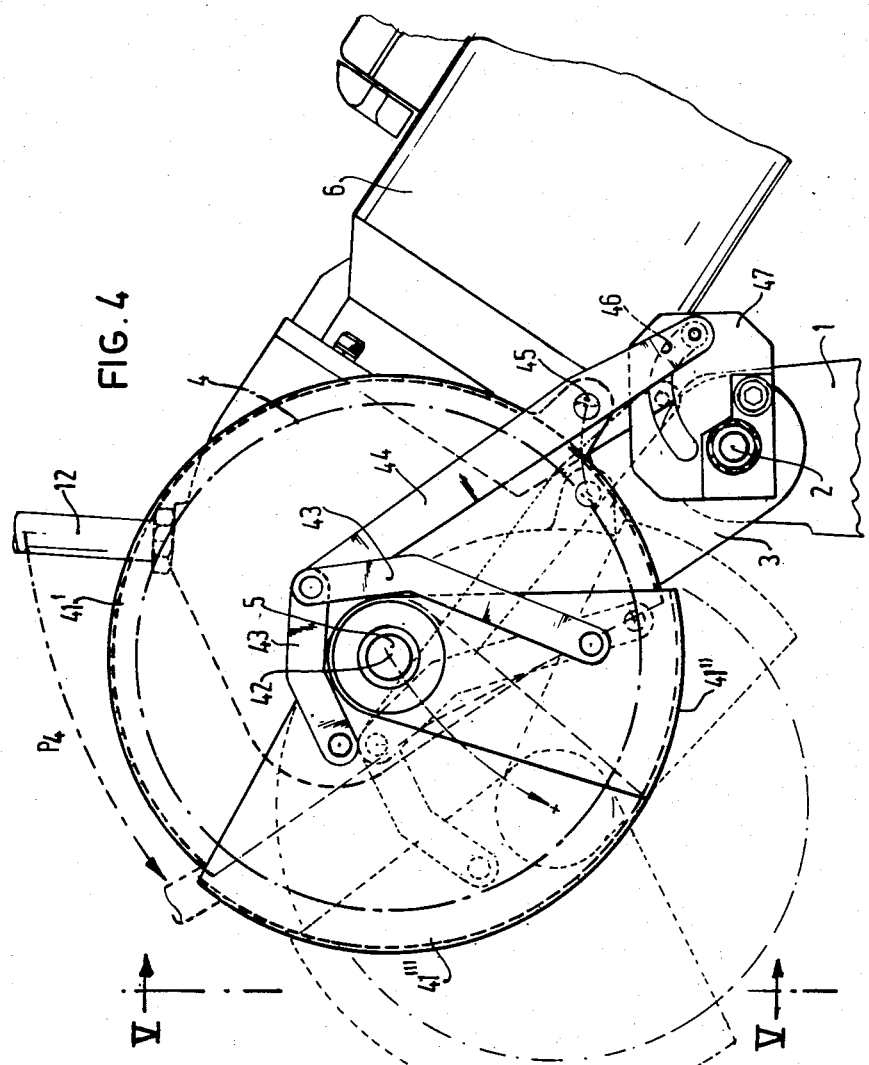
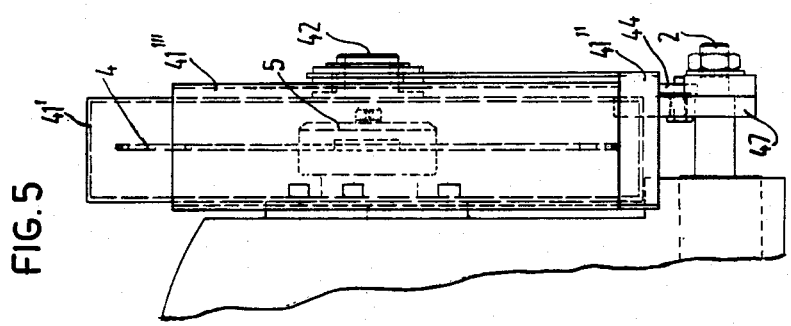

SAWING DEVICE AND ASSOCIATED CLAMP AND SAFETY CAP

The invention relates to a sawing device mainly comprising a frame having a clamp provided with mutually displaceable jaws for the product to be sawn, a holder adapted to pivot about a shaft of the frame with respect to the clamp and a circular saw blade rotatably journalled in said holder and being at right angles to said shaft.

Such a sawing machine is usually employed for shortening material, in which the saw blade is manually passed through the product to be sawn by means of a handle provided on the holder. Such machines are also equipped with pneumatic or hydraulic setting means for passing the saw blade across the product.

The invention has for its object to minimize the required starting effort without the saw blade starting to "bite" i.e. without the saw blade eating itself into the product to be sawn and hence being jammed as a result of the sawing forces.

The device according to the invention is distinguished in that in all positions of the holder the tangential point formed by an imaginary tangential line going through the shaft at the circumference of the saw blade is located between the medium perpendicular plane of the clamping jaws and the shaft.

Owing to the disposition of the shaft and the clamping jaw proposed by the invention the resultant saw force vector will pass along the side of the shaft remote from the saw blade so that said biting does not occur.

The invention furthermore relates to a clamp suitable for use on a sawing machine, provided with mutually displaceable jaws, at least one of which is provided with a screw sleeve co-operating with a screw spindle. According to the invention the clamp is distinguished in that the screw sleeve is arranged on the side of one jaw remote from the other jaw and in that the length of the screw sleeve together with the thickness of the jaw is equal to or larger than the axial length of the screwthread on the spindle.

This construction prevents the screwthread of the spindle from being exposed so that the screwthread will not be soiled by chips of material and a long lifetime of the clamp is ensured.

The invention furthermore relates to a sawing device mainly comprising a clamp for the product to be sawn carried by a frame, a holder adapted to pivot about a shaft of the frame, a circular saw blade rotatably journalled in said holder, the blade being at right angles to the shaft, and a cap extending around the saw blade, said cap comprising, in accordance with the invention, a part being stationary relative to the saw blade and at least one part pivoted to the stationary part and connected with the frame by means of a leverage.

By means of the leverage the pivotable part is moved during the downward movement of the holder so that the saw is set free without the cap touching the work piece or the clamp. Nevertheless the peripheral part of the saw blade not being in contact with the work piece remains completely enveloped by the protective cap so that optimum safety is ensured.

Preferably the leverage comprises a rocking arm rotatably connected with the stationary cap part, one end of the arm being connected with each movable cap part through a coupling rod each and the other end being coupled with the frame. This construction of the leverage permits of using a so-called sight cap, in which two movable parts turn away from one another during the downward movement of the holder so that the saw is set free. With such a cap the saw is completely screened in a non-operative position.

In a particularly effective embodiment each movable part is pivoted to the stationery part so as to be pivotable about a common axis parallel to the rotary axis of the saw blade.

The invention will be described more fully with reference to two embodiments.

Figure 2:
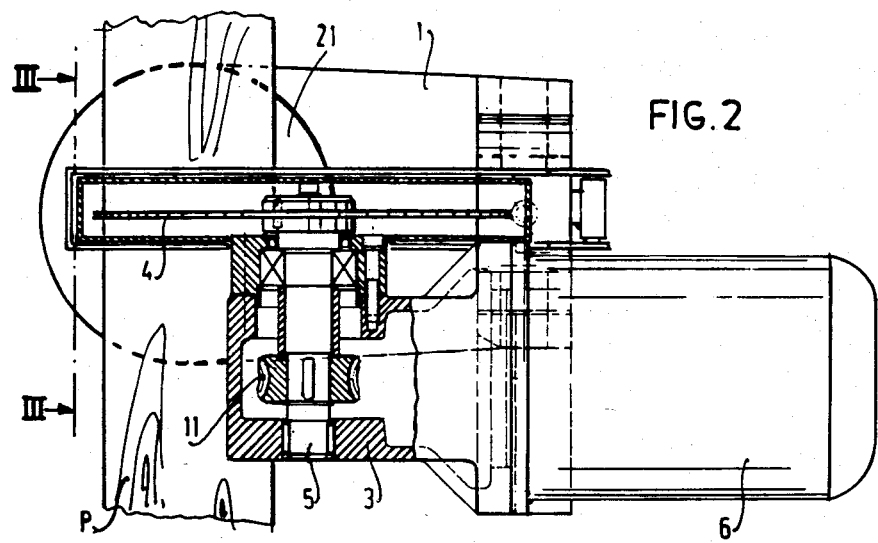
Figure 3:
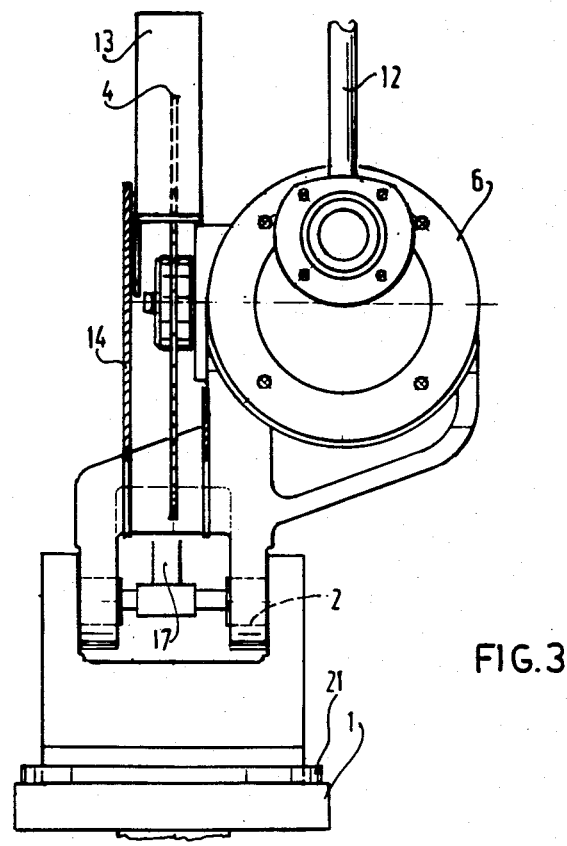

The drawing shows in:

FIG. 1 a side elevation of a sawing device embodying the invention, some parts being partly broken away, FIG. 2 a plan view on the line II—II in FIG. 1, FIG. 3 an elevational view taken on the line III—III in FIG. 2, FIG. 4 a side elevation like FIG. 1 of part of the device having a differently constructed safety cap, FIG. 5 an elevational view taken on the line IV—IV in FIG. 4.

The device comprises a foot or supporting part 1 provided on the right-hand side as viewed in FIG. 1 with a stub shaft 2, about which a holder 3 for a saw blade 4 is pivotable. The saw blade is fastened to a shaft 5 journalled in the holder 3. To the holder 3 is fastened a motor 6, the output shaft 7 of which is connected through a spur wheel transmission 8 with a worm shaft 9. The worm 10 on the worm shaft 9 co-operates with the worm wheel 11 on the saw blade shaft 5.

The holder 3 is provided with a lever 12, which terminates in a handle (not shown).

Around the saw blade 4 is arranged a protective cap consisting of an upper part 13 regidly secured to the holder 3 and screening the upper half of the saw blade 4.

The protective cap furthermore comprises a movable, lower part 14, which is pivotally connected at 15 with the holder 3.

The lower part is furthermore provided with a lever 16, to the end of which is pivoted a coupling element 17, which has its lower end pivoted to the support 1. The underside of the movable lower part 14 of the protective cap is open.

The foot or support 1 carries furthermore a clamp for the product P to be sawn, said clamp comprising two mutually displaceable jaws 18, the displacement of which is performed by means of a screw spindle 19. The screw spindle 19 is rotatably journalled in the middle in a console 20 on a round foot plate 21. The foot plate has a screw stud 22 on the lower side which is rotatably held in the support 1. Onto the screwthread can be screwed a nut 23 provided with a handle 24 so that the foot plate 21 can be clamped tight to the support 1 in any desired angular position.

At both ends the screw spindle 19 has a screw-thread 25, on which a screw sleeve 26 is axially reciprocatable as a result of the turn of the screw spindle 19 by means of the handle 27. The screw sleeve 26 is connected with a carrier 28 for the clamp jaw 18. The axial length of the screw sleeve and the thickness of the carrier is equal to the length of the screwthread 25 on the spindle 19.

Owing to the symmetrical structure of the screw spindle and the clamp jaws 18 displaceable thereon the clamp jaws maintain a perpendicular medium plane V—V passing through the console 20 and the centre line of the screw stud 22.

The disposition of the perpendicular medium plane V—V, the stub shaft 2 and the saw blade 4 is such that the imaginary tangential line from the centre of the stub shaft 2 to the circumference of the saw blade 4 has a tangential point, which in all positions of the holder 3 remains positioned in front of the plane V—V, that is to say, between said plane and the stub shaft 2 (see FIG. 1) in which the broken lines 29 with the tangential point 30 indicate the various positions of the saw blade 4. In this design the product P is first sawn at the right-hand top and finally at the left-hand bottom, which means that the resultant saw force vector that can be drawn as a tangential line approximately from the centre of the saw arc length to said arc passes below the centre of the stub shaft 2. Resolution of this force vector K in a co-ordinate system, one axis of which goes through the centre of the stub shaft 2, yields a resultant force R, which indicates the force required for starting the sawing operation. As long as the vector K passes below the centre of the stub shaft 2 a positive starting force remains necessary so that the device will not "bite". Nevertheless, FIG. 1 shows that the resultant force R is comparatively small so that the required starting force also remains light.

From FIG. 1 it is furthermore apparent that in the various working positions the movable part 14 of the protective cap remains in an upright position (see the broken line 31) owing to the pivot structure 15, 16, 17 so that this cap remains free of the product P to be sawn. Nevertheless the saw blade 4 can move through the open underside.

The device shown in the figures permits in an extremely easy manner of exchanging the spur wheel transmission 8, to which end only the motor 6 with its flange 32 need be disengaged from the holder 3 so that the two spur wheels become accessible for exchange. In this way the device can be readily adapted to different diameters of saw blades 4 for which the desired transmission ratio of the gear wheel transmission 8 can be chosen.

The invention is not limited to a device of the kind described above, it being noted that the saw blade 4 may, as an alternative, be operative in a horizontal plane, in which case the stub shaft 2 is vertical. Other clamps than those shown may be used, for example, a stationary clamp jaw 18 say the right-hand one in FIG. 1 being taken as a basis, for which purpose only the left-hand one need be displaced along the screw spindle 19. Then, indeed, the perpendicular medium plane V—V shifts in place accordingly, but by appropriate proportioning and disposition of the stationary clamp jaw with respect to the stub shaft 2 the tangential point 30 remains on the desired side of the perpendicular medium plane V—V in all positions of the saw blade 4. For completeness' sake it should be noted that a turn of the clamp jaws 18 with respect to the spindle 22 does not cause modification of the state set forth above because the perpendicular medium plane V—V permanenly goes through the centre line of the screw spindle 22.

FIGS. 4 and 5 illustrate an alternative embodiment of the protective cap. In these figures identical parts are disignated by the same reference numerals.

The holder 3 is adapted to move up and down about a stub shaft 2 with respect to the frame part 1 in a vertical plane in the direction of the arrow P4. The holder carries a motor 6 and a gear box having, for example, a worm wheel transmission as shown in FIG. 1 for driving the saw blade 4.

The saw blade is surrounded by a safety cap 41 comprising a part 41', which is stationary with respect to the holder 3 and two movable 41'' and 41'''. Each movable part is connected with the stationary part 41' so as to be pivotable about an axis 42 parallel to the rotary axis 5 of the saw blade. Each movable part has a coupling rod 43, all rods being connected with one end of a rocking rod 44. The rocking rod is pivotable about point 45 and connected with the stationary part 41', whereas the other end of the rocking rod 44 is guided in a curved path 46 recessed in a plate 47 rigidly secured to the frame 1.

When the holder 3 is moved downwards by means of the lever 12 in the direction of the arrow P4, the end of the rocking arm 44 guided in the curved path 46 will move the coupling point with the coupling rods 43 away from the fulcrum 42 so that the movable parts 41'' and 41''' of the safety cap turn outwardly about the pivotal axis 42 as indicated by a broken line in FIG. 4.

The proportions of the coupling rods and the rocking arm 44 are chosen so that divergence of the movable parts of the safety cap will take place just above the work piece so that the circumferential part of the saw blade not being in contact with the work piece remains fully enclosed in the safety cap. Such a construction has the advantage that in the non-operative state of the saw blade (see the solid lines in FIG. 4) the saw blade is completely surrounded also on the side directed towards the work piece.

What is claimed is:

1. A sawing device mainly comprising a frame, a clamp for the product to be sawn provided with mutually displaceable jaws, a holder adapted to pivot about a shaft of the frame with respect to the clamp and a circular saw blade rotatably journalled in said holder, the blade being at right angles to said shaft, and means for moving said jaws in unison toward and away from each other to clamp a workpiece therebetween so that the tangential point formed by an imaginary tangential line going through the shaft centre to the circumference of the saw blade is located in all positions of the holder between the perpendicular medium plane of the clamp and the shaft.

2. A device as claimed in claim 1 characterized in that the shaft extends horizontally at the level of the clamp jaws.

3. A sawing device mainly comprising a clamp for the product to be sawn carried by a frame, a holder pivotable about a stub shaft of the frame and means for manually swinging said holder about the axis of said stub shaft toward and away from said clamp, a circular saw blade rotatably journalled in said holder, the blade being at right angles to the stub shaft and a cap extending around the saw blade, characterized in that the cap comprises one part which is stationary with respect to the saw blade and at least a second part which is pivotable on the stationary part and which is connected with the frame by means of a lever system, said second part being pivoted about a second axis which is displaced from the axis first mentioned and said lever system including a lever connected to said second part and to said frame whereby said second part exposes a portion of said saw blade only as the saw blade approaches the clamp.

4. In a sawing device, the combination of a frame, a support journalled on said frame for movement about an axis, a saw assembly carried by said support and including a driving motor and a shaft driven thereby and a circular saw blade fixed to said shaft, said shaft being disposed in spaced parallel relation to said axis, and means for manually swinging said frame about said axis so that said shaft is movable toward a workpiece, and work holding means on said frame for holding a workpiece relative to said axis and said shaft such that as the saw blade is engaging a workpiece to cut it transversely the locii of the points at which a line intersecting said axis and tangent to the periphery of the circular saw blade remain between a medial plane extending longitudinally of the workpiece and said axis, said work holding means comprising a pair of jaws and means for moving said jaws in unison toward and away from each other whereby to define and fix said medial plane therebetween.

5. In a sawing device as defined in claim 4 wherein said axis is located in a second plane perpendicular to said medial plane and passing through said jaws with said axis positioned beyond said jaws so that said shaft moves on an arc toward said second plane along a path more remote from said axis than said locii.

6. A device as defined in claim 3 wherein said lever system includes a coupling element pivotally connected at one end to said lever and at its other end to said frame.

7. A device as defined in claim 3 wherein said cap includes a third part, said second and third parts being pivoted about an axis common with that of said saw blade, said lever being pivotally connected at one end to said second part, a second lever pivotally connected at one end to said third part and at its other end to the other end of the lever first mentioned, and a coupling member pivotally connected to said other ends of the levers and arcuately guided at its other end in said frame, an intermediate portion of said coupling member being pivotally connected to said one part of the cap.

* * * * *